US010083066B2

(12) United States Patent
Chen et al.

(10) Patent No.: US 10,083,066 B2
(45) Date of Patent: Sep. 25, 2018

(54) PROCESSING DATA BY USING SIMULTANEOUS MULTITHREADING

(71) Applicant: INTERNATIONAL BUSINESS MACHINES CORPORATION, Armonk, NY (US)

(72) Inventors: Guan Cheng Chen, Beijing (CN); Qi Guo, Beijing (CN); Jian Li, Austin, TX (US); Xin Li, Beijing (CN); Yan Li, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 42 days.

(21) Appl. No.: 14/288,612

(22) Filed: May 28, 2014

(65) Prior Publication Data

US 2014/0359635 A1 Dec. 4, 2014

(30) Foreign Application Priority Data

May 31, 2013 (CN) .......................... 2013 1 0209952

(51) Int. Cl.
*G06F 9/50* (2006.01)

(52) U.S. Cl.
CPC ...... *G06F 9/5083* (2013.01); *G06F 2209/508* (2013.01)

(58) Field of Classification Search
CPC .......................... G06F 9/5083; G06F 2209/508
See application file for complete search history.

(56) References Cited

U.S. PATENT DOCUMENTS 8,296,773 B2   10/2012  Bose et al.
9,063,906 B2 *  6/2015  Busaba ............... G06F 11/0715
(Continued)

FOREIGN PATENT DOCUMENTS

CN         102096603 B     1/2013

OTHER PUBLICATIONS

Seungryul Choi and Donald Yeung; Learning-Based SMT Processor Resource Distribution via Hill-Climbing; 2006; 12 pages.*
(Continued)

*Primary Examiner* — Craig C Dorais
*Assistant Examiner* — Kimberly L Jordan
(74) *Attorney, Agent, or Firm* — Cantor Colburn LLP; David Quinn

(57) ABSTRACT

A computer implemented method and system for data processing. An example method includes setting at least one SMT preliminary value for at least one operating node; monitoring performance metrics for the at least one operating node set to the at least one SMT preliminary value; and determining a SMT revised value based on performance metrics. An example system includes a memory; a processor communicatively coupled to the memory; and a feature selection module communicatively coupled to the memory and processor. The feature selection module performs a method that includes setting, using a setting device, at least one SMT preliminary value for at least one operating node; monitoring, using a monitoring device, performance metrics for the at least one operating node set to the at least one SMT preliminary value; and determining, using a determining device, a SMT revised value based on performance metrics.

20 Claims, 5 Drawing Sheets

(56) References Cited

U.S. PATENT DOCUMENTS

| | | | |
|---|---|---|---|
| 2006/0184741 A1* | 8/2006 | Hrusecky | G06F 12/084 |
| | | | 711/130 |
| 2009/0064164 A1 | 3/2009 | Bose et al. | |
| 2009/0292892 A1 | 11/2009 | Abernathy et al. | |
| 2009/0328055 A1* | 12/2009 | Bose | G06F 1/3203 |
| | | | 718/105 |
| 2011/0154341 A1 | 6/2011 | Pueyo et al. | |
| 2012/0174114 A1 | 7/2012 | Matsumoto et al. | |
| 2013/0031558 A1 | 1/2013 | Balmin et al. | |
| 2013/0074084 A1 | 3/2013 | Kumar et al. | |
| 2013/0347005 A1* | 12/2013 | Lam | G06F 9/542 |
| | | | 719/318 |

OTHER PUBLICATIONS

Ranger et al., "Evaluating MapReduce for Multi-core and Multi-processor Systems", HPCA '07 Proceedings of the 2007 IEEE 13th International Symposium on High Performance Computer Architecture, 2007, pp. 13-24, IEEE Computer Society.

Subramaniam et al., "Characterizing the Performance and Energy Efficiency of Simultaneous Multithreading in Multicore Environments", 2012 41st International Conference on Parallel Processing Workshops, Sep. 2012, pp. 592-593, IEEE.

Balmin et al., "Adaptive MapReduce Using Situation-Aware Mappers", EDBT '12 Proceedings of the 15th International Conference on Extending Database Technology, 2012, pp. 420-431, ACM New York, NY, USA © 2012.

Fallabs, "More Concurrent MapReduce", Jun. 2011, http://fallabs.com/blog/promenade.cgi?id=33.

CN Office Action for Application No. 201310209952.X, dated May 31, 2016, pp. 1-11.

* cited by examiner

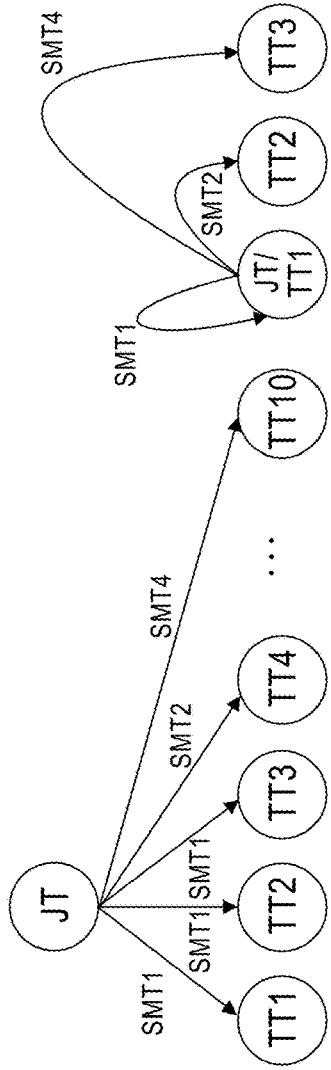
FIG. 3A
FIG. 3B
FIG. 3C
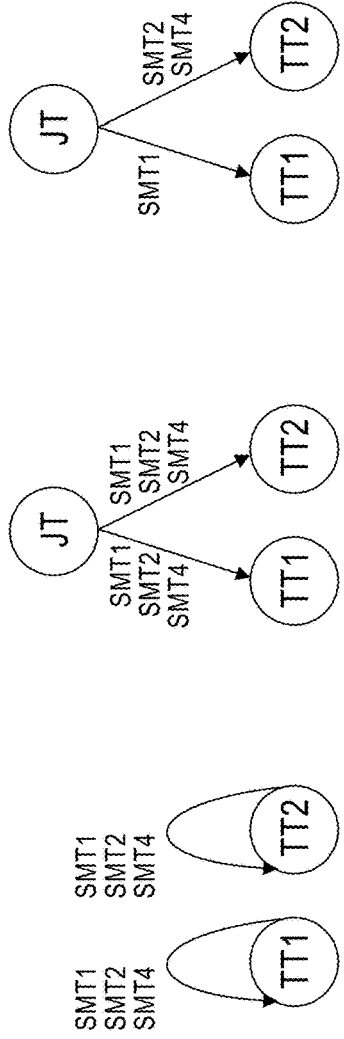
FIG. 4A
FIG. 4B
FIG. 5
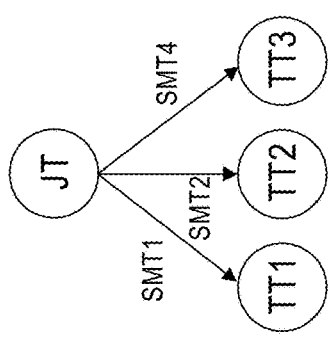
FIG. 3D

PROCESSING DATA BY USING SIMULTANEOUS MULTITHREADING

CROSS-REFERENCE TO RELATED APPLICATION

This application claims priority under 35 U.S.C. § 119 from Chinese Patent Application No. 201310209952.X filed May 31, 2013, the entire contents of which are incorporated herein by reference.

BACKGROUND OF THE INVENTION

1. Field of the Invention

The present invention generally relates to data processing, and more specifically, to a method and apparatus of processing data by using simultaneous multithreading.

2. Description of Related Art

A traditional CPU can only process an instruction sequence at a certain time, commonly called as a thread. In thread process, it is necessary for the processing unit of a CPU to continuously fetch instructions and data for processing. With the development of CPU technology, frequency and performance are increasingly improved for CPU, leading to the requirement for faster and faster instructions and data fetch. Unfortunately, the development of memory technology can not catch up with the evolution of CPU. As a result, memory commonly suffers from being unable to support a CPU with sufficient instructions and data for processing. Thus, the Simultaneous Multithreading (SMT) technique emerged. SMT is a hardware multi-thread technique that enables instructions from multiple threads to run within the same CPU clock cycle. In nature, SMT is a method for converting thread-level parallel processing (on multiple CPUs) to instruction-level parallel processing (on a single CPU). Simultaneous multithreading is an ability of dispatching instructions from multiple hardware thread contexts by a single physical processor. SMT enables a CPU to schedule several applications simultaneously, so that the features of the superscalar structure can be employed. SMT can bring performance optimization for processing business transaction workloads. When the overall system throughput is concerned rather than the throughput of individual threads, SMT is an excellent option. However, not all applications can realize performance optimization with SMT. For those applications having performance restrictions on execution units or those ones that exhaust the whole memory bandwidth of CPU, their performances cannot be improved through running two threads on the same processor. Currently, SMT has been enabled on some high-end processors.

BRIEF SUMMARY OF THE INVENTION

The present invention provides a computer implemented data processing method, including: (a) setting at least one simultaneous multithreading (SMT) preliminary value for at least one operating node; (b) monitoring performance metrics for the at least one operating node set to the at least one SMT preliminary value; and (c) determining a SMT revised value based on the performance metrics.

Another aspect of the present invention provides a data processing system, including: a memory; a processor communicatively coupled to the memory; and a feature selection module communicatively coupled to the memory and the processor, wherein the feature selection module is configured to perform the steps of a method including: setting, using a setting device, at least one simultaneous multithreading (SMT) preliminary value for at least one operating node; monitoring, using a monitoring device, performance metrics for the at least one operating node set to the at least one SMT preliminary value; and determining, using a determining device, a SMT revised value based on the performance metrics.

BRIEF DESCRIPTION OF THE DRAWINGS

Through the more detailed description of some embodiments of the present disclosure in the accompanying drawings, the above and other objects, features and advantages of the present invention will become more apparent, wherein the same reference generally refers to the same components in the embodiments of the present invention.

FIG. 3A shows a schematic diagram according to an embodiment of the present invention for setting SMT preliminary values through centralized decision.

FIG. 3B shows a schematic diagram of another embodiment of the present invention for setting SMT preliminary values through centralized decision.

FIG. 3C shows a schematic diagram of a further embodiment according to the present invention for setting SMT preliminary values through centralized decision.

FIG. 3D shows a schematic diagram of still a further embodiment of the present invention for setting SMT preliminary values through centralized decision.

FIG. 4A shows a schematic diagram of an embodiment according to the present invention for setting SMT preliminary values through localized decision.

FIG. 4B shows a schematic diagram of another embodiment according to the present invention for setting SMT preliminary values through localized decision.

FIG. 5 shows a schematic diagram of an embodiment of the present invention for setting SMT preliminary values through a combination of centralized decision and localized decision.

DETAILED DESCRIPTION OF THE PREFERRED EMBODIMENTS

Figure 1:
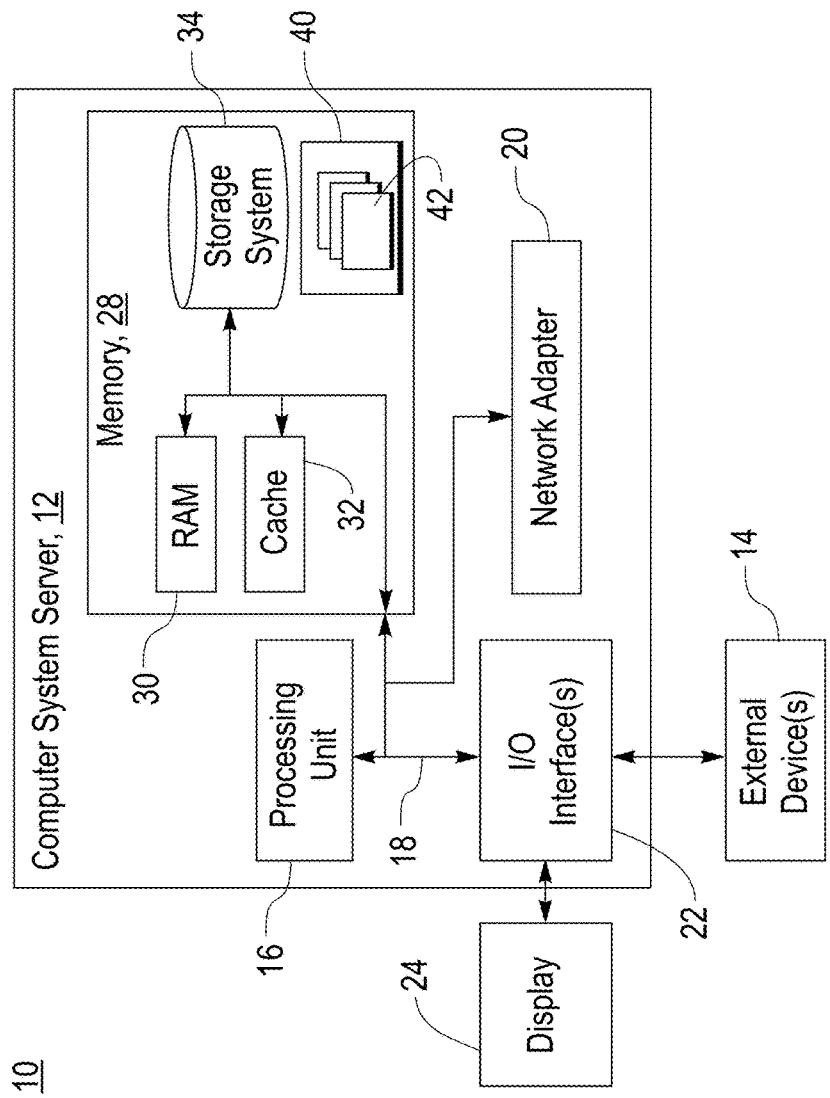
FIG. 1 shows an exemplary computer system 100 which is applicable to implement the embodiments of the present invention.

Although SMT has become available on some high-end CPUs, SMT setting is not automatic. It must be determined manually an appropriate SMT value, i.e., the number of hardware threads that run on a processor core simultaneously. However, interactions between programs and hardware resources continuously vary with the execution of programs and variations in tasks. Thus, the optimal SMT value changes constantly. In fact, the optimal SMT value depends on several factors, including task features, such as 10 intensive tasks, CPU intensive tasks, and the like, as well as software and hardware configurations and software-hardware interactions. Therefore, it is difficult to summarize some simple rules for the determination of the optimal SMT value.

In view of above, the present invention has automatically determined the SMT value according to performance metrics. That is, a SMT value that optimizes the performance metrics will be automatically determined and then used in subsequent data processing.

Particularly, a data processing method is provided in the present invention. The method includes: setting at least one SMT preliminary value for at least one operating node; monitoring performance metrics for the at least one operating node under the at least one SMT preliminary value; and automatically determining a SMT revised value based on the performance metrics.

A data processing system is further provided in this invention. The system includes: a setting device configured to set at least one SMT preliminary value for at least one operating node; a monitoring device configured to monitor performance metrics for the at least one operating node under the at least one SMT preliminary value; and a determining device configured to determine a SMT revised value based on the performance metrics.

According to an embodiment of this invention, the SMT value can be automatically determined according to run-time performance metrics, so that the SMT value can be changed to adapt to variations in system operation without human settings of the SMT value.

Some preferable embodiments will be described in more detail with reference to the accompanying drawings, in which the preferable embodiments of the present invention have been illustrated. However, the present invention can be implemented in various manners, and thus should not be construed to be limited to the embodiments disclosed herein. On the contrary, those embodiments are provided for the thorough and complete understanding of the present invention, and completely conveying the scope of the present invention to those skilled in the art.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

According to an embodiment of the present invention, the SMT value can be adjusted adaptively. That is, a SMT value that is more advantageous to overall system performance is selected for data processing. Thus, it is not required to revise the SMT value manually, while ensuring that the adopted SMT value is suitable for tasks that are currently executed, as well as hardware and software configurations. No complex analysis on the types of tasks that are currently executed and hardware/software configurations is required in the embodiment; instead, a SMT value optimum for system run-time performance is found and then is adopted, through a train process. Basically, the embodiment can be divided into two phases: a train phase and an execution phase. In the train phase, a SMT preliminary value is set, system runtime performance metrics under the SMT preliminary value is monitored, and a SMT revised value is determined according to the performance metrics. In the execution phase, the SMT revised value is adopted for data processing.

Figure 2:
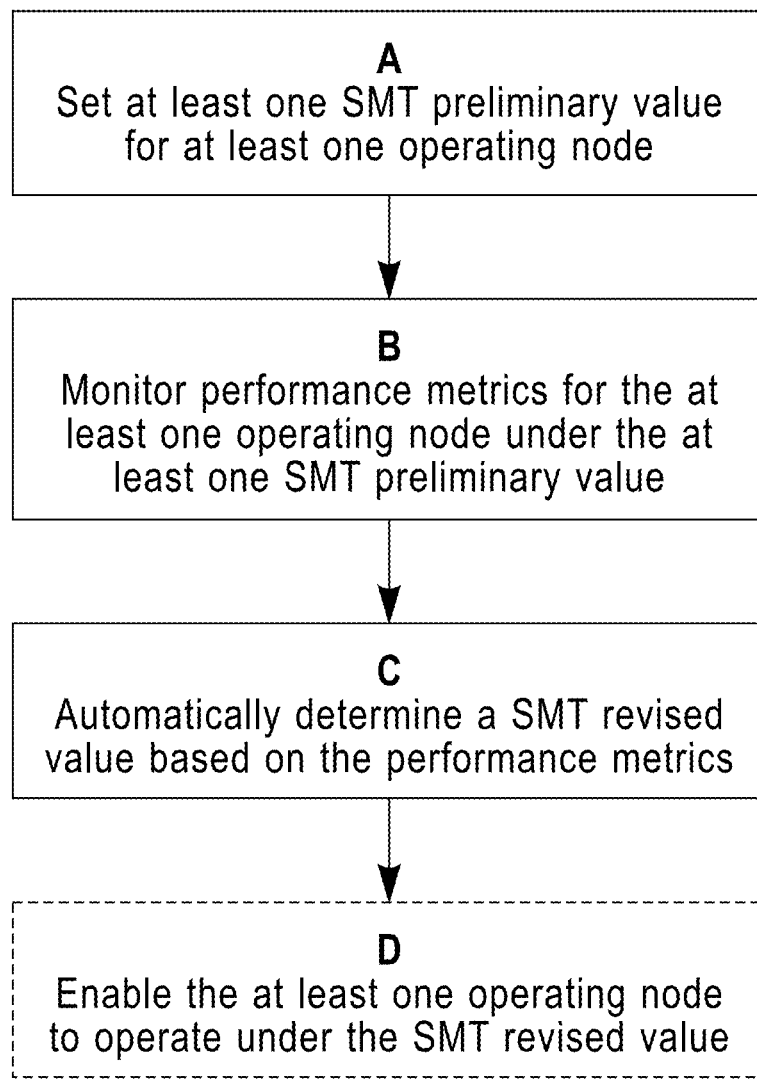
FIG. 2 shows a flowchart of a method for data processing by using SMT according to an embodiment of the present invention.

FIG. 2 shows a flowchart of a method for data processing by using SMT according to an embodiment of the present invention. Particularly, FIG. 2 depicts a data processing method, wherein, in step A, at least one SMT preliminary value is set for at least one operating node. Wherein, the SMT preliminary value represents preliminary amounts of hardware threads being executed in parallel on a processor core. In general, SMT1 represents executing a single thread on a processor core, SMT2 represents executing two threads on a processor core, SMT4 represents executing four threads on a processor core, and so on. This embodiment is applicable to one operating node or multiple operating nodes, as described in more detail hereinafter. The set SMT preliminary value can be assigned manually, or can be assigned automatically in a random manner, or can be assigned according to predetermined criteria.

At step B, performance metrics is monitored for the at least one operating node under the at least one SMT preliminary value. In the train phase, the system is not aware of which SMT preliminary value is the best for system operation, so that a monitoring process is necessary for determining which SMT preliminary value is the best. The performance metrics can be any metrics for measuring operating performance of one or more operating nodes, such as cycles per instruction (CPI), cache miss ratio, branch mispredications, fraction of floating point operations, and the like, or a combination thereof. According to the performance metrics, it can be determined whether an operating node can bring performance optimization under the current SMT preliminary value, and in turn which SMT value shall be adopted to realize overall performance optimization.

At step C, a SMT revised value is automatically determined based on the performance metrics. According to an embodiment of the present invention, the SMT preliminary value under which the monitored performance metrics is optimal will be selected as the SMT revised value. According to another embodiment of the present invention, if the monitored performance metrics meets predetermined criteria under a SMT preliminary value, the SMT preliminary value is determined as the SMT revised value, and then in subsequent execution phase, operating nodes are enabled to perform data processing under the SMT revised value. For instance, if the performance metrics has met predetermined criteria under SMT1, then SMT1 is used as the SMT revised value without the comparison of whether performance metrics under SMT2 is more preferable.

Optionally, the data processing method shown in FIG. 2 further includes a step D in which the at least one operating node is enabled to operate under the SMT revised value (shown by the dashed line in the figure). The at least one operating node is enabled to perform data processing under the SMT revised value, so that its performance is optimized.

It will be understood, although steps A-D are depicted in sequence in FIG. 2, it is not necessary for step C and step D to execute after the completion of step B. That is, according to an embodiment of the invention, the SMT revised value is not automatically determined until the monitoring of the performance metrics is complete. However, according to another embodiment of the present invention, the SMT revised value can be automatically determined before the monitoring of the performance metrics is complete. That is, the monitoring of the performance metrics is a continuous process, which can persist during the process of step C and step D, and the persistent monitoring can be further used to determine whether it is required to determine a new SMT value again, i.e., whether steps A-C need to be executed again. Thus, according to an embodiment of the present invention, the data processing method further includes, in response to detecting the deteriorated performance metrics, iterating steps A-C (not shown in the figure). Since deteriorated performance metrics can imply that the current SMT value is unsuitable for the current operating condition, and produces negative effects on performance improvement, thus it is necessary to reselect an appropriate SMT value. It should be noted that the iteration of steps A-C does not necessarily imply the exclusion of the iteration of other steps. For instance, in an embodiment, steps A-D can be iterated.

According to an embodiment of this invention, steps A-C are merely executed at run time, thus the determination of the SMT value will not influence the normal operation of operating nodes. The operating results obtained in the train phase A-C will not be wasted, so that efficiency in the operating phase is ensured. Note that executing steps A-C merely at run time does not imply that other steps cannot be executed at run time. For instance, in an embodiment, steps A-D are all executed at run time.

According to another embodiment of the present invention, steps A-C are executed at build time, and step D is executed at run time. Thus, the build time operation is for the purpose of determining a SMT revised value appropriate at runtime, in which case the build time operating results will be discarded, and computation is performed again at runtime according to the SMT revised value.

The present invention is applicable to SMT dynamic adjustment in the MapReduce framework or common programming frameworks (such as common multi-thread programs). For convenience, a description will be given below with the MapReduce framework as an example. However, it should be understood that, unless otherwise specified, the embodiment hereinafter is applicable to not only the MapReduce framework but also other frameworks of common programs.

FIG. 3A shows a schematic diagram of an embodiment in which SMT preliminary values are set through centralized decision. The figure schematically shows nodes in a MapReduce framework, wherein JT (JobTracker) corresponds to a master, TTs (TaskTracker) correspond to slaves, that is, operating nodes in the present invention. JT is responsible for distributing MapReduce tasks to different TTs to perform thereon, and collecting and monitoring situations of tasks running on the TTs. If tasks on some TTs fail, JT is also responsible for redistributing the failed tasks to other TTs. TTs take charge of execute MapReduce tasks and transmit task conditions to JT periodically.

FIG. 3A shows a schematic diagram of one JT and three TT in cooperation with each other. Step A in FIG. 2 is further implemented to set multiple SMT preliminary values for multiple operating nodes, including setting a SMT preliminary value for each operating node. For example, JT sets a SMT preliminary value of SMT1 for TT1, a SMT preliminary value of SMT2 for TT2, and a SMT preliminary value of SMT4 for TT3. In subsequent steps, step B is further implemented to monitor performance metrics of the multiple operating nodes under the multiple SMT preliminary values, that is, monitor performance metrics of TT1, TT2, TT3 under SMT1, SMT2, SMT4. TT1, TT2, and TT3 can return the performance metrics measured thereon to JT for subsequent comparison. Step C is further implemented to select the SMT preliminary value of an operating node having optimal performance metrics as a SMT revised value. In the train process, it has been found that TT2 had optimal performance metrics, and therefore SMT2 adopted for TT2 is determined as the SMT revised value. Optionally, step D is further implemented to cause the multiple operating nodes to operate under the same SMT revised value. That is, in the execution phase, TT1, TT2, TT3 are caused to perform data processing with SMT2, since SMT2 can bring optimal performance.

FIG. 3B shows a schematic diagram of another embodiment for setting SMT preliminary values through centralized decision. If the number of TTs is larger than the number of SMT preliminary values, for example, there are total 10 TTs and only three SMT preliminary values available for assignment, the SMT preliminary values can be assigned to these TTs as evenly as possible (for example, assigning SMT1 to TT1-TT3, SMT2 to TT4-TT6, and SMT4 to TT7-TT10). And then monitored performance metrics under the same SMT preliminary value returned from multiple TTs are averaged as the performance metrics under the SMT preliminary value. Through comparing performance metrics under multiple SMT preliminary values, it can be determined which SMT value should be determined as the SMT revised value.

FIG. 3C shows a schematic diagram of still another embodiment for setting SMT preliminary values through centralized decision. In this example, JT is not a stand-alone node, but is acted by one of the TTs, such as TT1 can play the role of JT to take charge of setting SMT preliminary values, determining the SMT revised value according to the monitored performance metrics of each node, and causing each operating node to perform under the SMT revised value.

FIG. 3D shows a schematic diagram of still another embodiment for setting SMT preliminary values through centralized decision. In this embodiment, JT is not a stand-alone node, but is acted by multiple of the TTs, such as TT1 can serve concurrently as JT to take charge of setting SMT preliminary values; TT2 can also serve as JT concurrently to take charge of determining the SMT revised value according to monitored performance metrics of each node, and causing each operating node to perform under the SMT revised value. Thus, the management tasks of JT can be distributed over multiple TTs.

For homogeneous TTs, centralized decision is more appropriate. Because in the case of homogeneous TTs, each operating node has the same hardware and software resource configurations, it is possible to determine the SMT preliminary value of which TT is the optimal SMT value through determining performance metrics measured for each TT. However, in the case of heterogeneous TTs, i.e., various TTs have different hardware/software resource configurations, the optimal SMT value can not be determined in a centralized decision anymore, because each TT has a different comparison baseline. Thus, in the case of heterogeneous TTs, localized decision disclosed below will be adopted for the determination.

FIG. 4A shows a schematic diagram of an embodiment for setting SMT preliminary values through localized decision. In the example shown in FIG. 4A, the two TTs are heterogeneous, so that TT1 and TT2 will determine appropriate SMT revised values respectively. Taking TT1 as an example, TT1 will set SMT preliminary values by itself. Thus, step A is further implemented to set multiple SMT preliminary values for an operating node, including setting multiple SMT preliminary values used for the operating node in several periods of time, for example, setting different SMT preliminary values used for TT1 in different time periods, so as to cause it to operate with SMT1 in time period 1 and SMT2 in time period 2 and SMT4 in time period 3. Step B is further implemented to monitor performance metrics of the operating node under the several SMT preliminary values, for example, monitor performance metrics of TT1 under SMT1, SMT2, and SMT4. Step C is further implemented to select a SMT preliminary value corresponding to a time period having optimal performance metrics as a SMT revised value. For example, if time period 2 has optimal performance metrics, SMT2 corresponding to time period 2 is selected as a SMT revised value. Optionally, step D is further implemented to cause the operating node to operate under the SMT revised value, for example, to cause TT1 to operate under SMT2. Similarly, TT2 can determine an appropriate SMT revised value for itself.

Note that the localized decision does not mean that the decision only can be performed locally on a TT, but it can be performed by JT. FIG. 4B shows a schematic diagram of another embodiment for setting SMT preliminary values through localized decision. In the example of FIG. 4B, the whole decision process is completed by JT. However, since TT1 and TT2 are heterogeneous, JT still sets three SMT preliminary values for TT1 (i.e., SMT1, SMT2, SMT4), monitors TT1's performance metrics under the multiple SMT preliminary values during multiple time periods, selects a SMT preliminary value corresponding to a time period having optimal performance metrics as a SMT revised value, and makes TT1 operate under the SMT revised value. It can be seen that the whole decision process is completed by JT, which makes its decision according to the independently monitored results from TT1, thus there is a fundamental difference between the present embodiment and the embodiment show in FIG. 3A. Similarly, JT can determine an appropriate SMT revised value for TT2 in a similar manner.

According to another embodiment of the present invention, JT in FIG. 4B can assign part of its decision task to a TT. For example, JT can designate TT1 to set multiple SMT preliminary values used in multiple time periods itself, and JT is still responsible for the execution of other steps B-D.

According to another embodiment of the present invention, the tasks of JT in FIG. 4B are completed by TT2, i.e. TT2 serves the role of JT to complete the decision process of determining SMT revised values for TT1 and TT2 themselves.

In comparison, centralized decision can distribute different SMT preliminary values for difference operating nodes, so that performance metrics is measured for different operating nodes under different SMT preliminary values. While localized decision provides different SMT preliminary values used in different time periods for the same operating node, and measures performance metrics of the operating node under different SMT preliminary values. The centralized decision is time economic for its monitoring process, because multiple operating nodes can monitor performance metrics in parallel, while the local decision is more appropriate to scenarios of multiple heterogeneous operating nodes or a few operating nodes (for example, only one operating node, in which case centralized decision is unsuitable).

If there are several TTs, with the amount of the TTs less than the amount of SMT preliminary values, for example, two TTs and three SMT preliminary values, in which case with centralized decision it is unable to assign a unique SMT preliminary value for each TT to monitor its performance metrics. Thus it is reasonable to combine centralized decision and localized decision to assign multiple SMT preliminary values to at least one TT, enabling it to measure performance metrics in multiple periods of time, so as to find a SMT revised value most conducive to performance optimization. FIG. 5 shows a schematic diagram of an embodiment for setting SMT preliminary values through a combination of centralized decision and localized decision. Step A is realized to set multiple SMT preliminary values for multiple operating nodes, wherein at least one operating node has multiple SMT preliminary values set for multiple time periods, such as SMT1 for TT1 as its preliminary value, SMT2 and SMT4 for TT2 as preliminary values to monitor its performance metrics in different monitoring time periods under different SMT preliminary values. Step B is further implemented to monitor performance metrics for the multiple operating nodes under the multiple SMT preliminary values, for example, monitor not only performance metrics of TT1 in time period 1 adopting SMT1, but also performance metrics of TT2 in time period 1 adopting SMT2, and performance metrics of TT2 in time period 2 adopting SMT4. Step C is further implemented to select a SMT preliminary value of an operating node corresponding to a time period having optimal performance metrics as the SMT revised value, for example, through comparison it is determined that TT2 in time period 1 has optimal performance metrics, and thus SMT2 adopted by TT2 in time period 1 is determined as the SMT revised value. Optionally, step D is further implemented to enable the multiple operating nodes to operate under the same SMT revised value, for example, enable TT1 and TT2 operate under SMT2.

Optionally, the tasks of JT in FIG. 5 can be partially or completely assigned to one or more TTs to execute.

It can be understood, although how to set SMT preliminary values in the MapReduce framework and the carry out subsequent steps has been disclosed in the description of FIG. 3A-FIG. 5, it should be appreciated that the embodiments are not limited to the MapReduce framework, and can be applied to other common program frameworks, except for different names for JT and TT.

Figure 6:
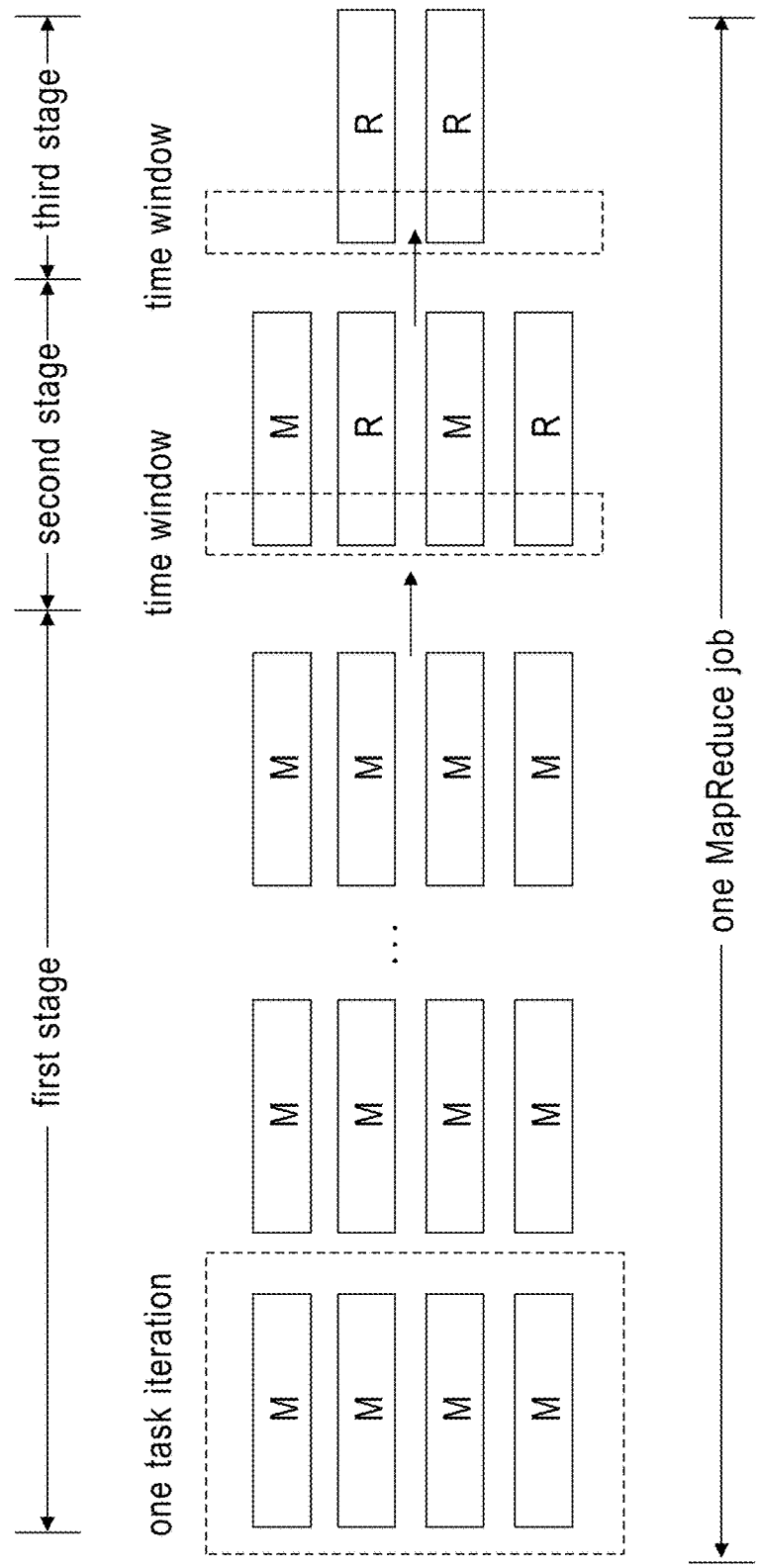
FIG. 6 shows a schematic diagram of various phases of applying the present invention in the MapReduce framework according to an embodiment of the present invention.

FIG. 6 shows a schematic diagram of applying this invention in the MapReduce framework according to an embodiment of the present invention. MapReduce is a programming model for large scale data sets and parallel computing. MapReduce distributes large-scale operations on a data set to various nodes on a network for reliability, and each node reports completed jobs and states periodically. In this programming model, users define a map function and a reduce function to solve problems. The map function is used to process key/value pairs inputted by a user, to produce a series of new key/value pairs as intermediate results. The reduce function uses a key/value list as its input, and processes a list of values bound to the same key to produce a final process result output. Thus, a complete job cycle under the MapReduce framework can be divided into three stages: a stage of only Map operation, a stage of paralleled Map operation and reduce operation, and a stage of only Reduce operation. FIG. 6 is a schematic diagram of these three stages.

Because these three stages have different operation tasks, they can have different appropriate optimal SMT values. For example, with respect to Terasort (which is a sort job in Hadoop), IO operations are dominant in the Map stage while computing tasks are dominant in the Reduce stage.

In order to determine an optimal SMT value for each stage, it is necessary to monitor each stage iteratively to determine a SMT value appropriate to the stage. According to an embodiment of this invention, at least one operating node operates in the MapReduce framework, steps A-C are executed when the at least one operating node is in the first stage. And the method further includes, in response to detecting that the at least one operating node switches from the first stage to the second stage, executing steps A-C again. Wherein the first stage and the second stage correspond to any one of the following combinations: only Map operation in the first stage and concurrent Map and Reduce operations in the second stage, concurrent Map and Reduce operations in the first stage and only Reduce operation in the second stage, only Reduce operation in the first stage and only Map operation in the second stage (switching from only Reduce operation to only Map operation represents that the process of a current MapReduce job has been completed, and switches to the process of a next MapReduce job). In the above example, when operation is switched from one stage to another stage, steps A-C are iterated, so that each stage is under the most appropriate SMT value. Note that repeating steps A-C mentioned above does not necessarily mean the exclusion of the iteration of other steps.

According to another embodiment of the present invention, if the data processing method includes step D, and if at least one operating node operates under the MapReduce framework, steps A-D are executed when at least one operating node is in the first stage of the MapReduce framework, and the method further includes, in response to detecting that at least one operating node switches from the first stage to the second stage, repeating the execution of steps A-D.

According to another embodiment of the present invention, the at least one operating node operates under the MapReduce framework, steps A-C are executed when the at least one operating node is in the stage of only Map operation in the MapReduce framework. And step C further includes: based on performance metrics of at least one operating node under at least one SMT preliminary value monitored in a predetermined task iteration, automatically determining the SMT revised value. in the example of FIG. 6, in the first stage of the MapReduce framework, the SMT revised value is determined from monitored performance metrics of the operating node in at least one task iteration, so that with a relatively complete sample cycle, more accurate sample results can be obtained, such that the monitored performance metrics can reflect performance metrics in at least one complete task iteration.

According to an embodiment of the present invention, the step C further includes: based on performance metrics of the at least one operating node under the at least one SMT preliminary value monitored in a predetermined time window, automatically determining the SMT revised value. In the example of FIG. 6, in the first stage of the MapReduce framework (a stage of only Map operation), the SMT revised value can be determined through monitoring performance metrics of the operating node in the predetermined time window also. Certainly, in the second stage of the MapReduce framework (a stage of paralleled Map and Reduce operations) and the third stage (only Reduce operation), because their operation is not divided by task iterations, it is difficult to monitor performance metrics on the basis of task iterations, thus in the second and third stages, it is more appropriate to monitor performance metrics according to the predetermined time window. Certainly, the time window length of the second stage can be the same with or different from that of the third stage. However, it should be understood that this embodiment is not limited to the MapReduce framework, and is applicable to other common program frameworks.

In summary, according to an embodiment of this invention, the SMT value can be adjusted dynamically in an automatic manner according to performance metrics, such that the SMT value setting can contribute to system performance optimization.

The data processing method of this invention has been described above, a data processing system under the same invention concept will be described below with reference to FIG. 7, wherein the same or corresponding details have been completely described in detail above, and thus can be omitted hereinafter.

Figure 7:
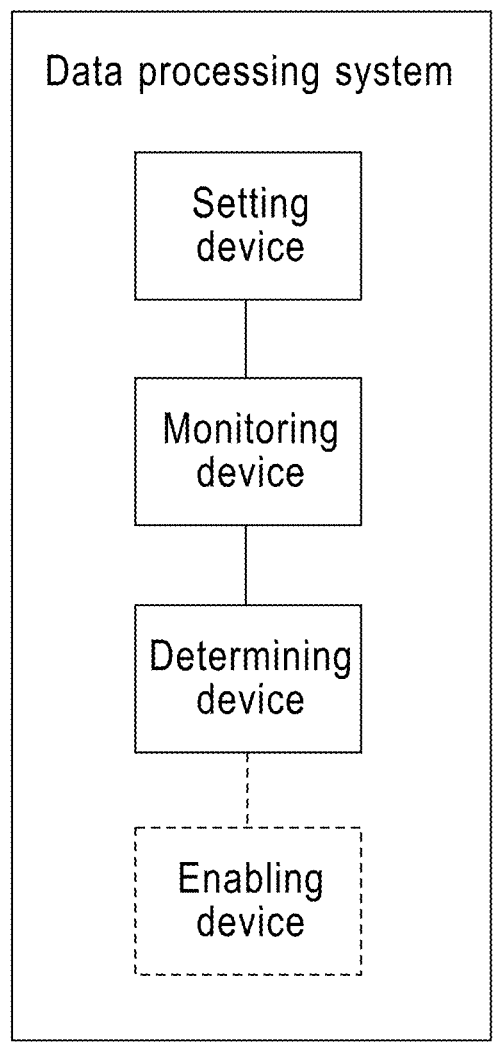
FIG. 7 shows a block diagram of a system for data processing by using SMT according to an embodiment of the present invention.

FIG. 7 shows a block diagram of a system for data processing by using SMT according to an embodiment of this invention. The data processing system of FIG. 7 includes: a setting device, a monitoring device, and a determining device. Optionally, the system of FIG. 7 can further include an enabling device. Wherein the setting device is configured to set at least one SMT preliminary value for at least one operating node. The monitoring device is configured to monitor performance metrics for the at least one operating node under the at least one SMT preliminary value. The determining device is configured to determine a SMT revised value based on the performance metrics. The enabling device is configured to enable the at least one operating node to operate under the SMT revised value.

According to an embodiment of the present invention, the at least one operating node operates under a MapReduce framework. When the at least one operating node is in the first stage of the MapReduce framework, the setting device, the monitoring device, and the determining device are operated. And the system is further configured to, in response to detecting that the at least one operating node switches from the first stage to the second stage, re-operate the setting device, the monitoring device, and the determining device. The first stage and the second stage correspond to any one of the following combinations: only Map operation in the first stage and concurrent Map and Reduce operations in the second stage, concurrent Map and Reduce operations in the first stage and only Reduce operation in the second stage, only Reduce operation in the first stage and only Map operation in the second stage.

According to an embodiment of the present invention, wherein the at least one operating node operates under the MapReduce framework, the setting device, the monitoring device, and the determining device are operated when the at least one operating node is in the first stage of the MapReduce framework in which only Map operation is executed. And the monitoring device is further configured to, based on performance metrics of the at least one operating node under the at least one SMT preliminary value monitored in a predetermined task iteration, automatically determine the SMT revised value.

According to an embodiment of this invention, wherein the monitoring device is further configured to, based on performance metrics of the at least one operating node under the at least one SMT preliminary value monitored in a predetermined time window, automatically determine the SMT revised value.

According to an embodiment of the present invention, wherein the setting device is further configured to set multiple SMT preliminary values for multiple operating nodes, including: setting a SMT preliminary value for each operating node. The monitoring device is further configured to monitor performance metrics of the multiple operating nodes under the multiple SMT preliminary values. The determining device is further configured to select a SMT preliminary value of an operating node having optimal performance metrics as the SMT revised value.

According to an embodiment of the present invention, wherein the setting device is further configured to set multiple SMT preliminary values for an operating node, including setting multiple SMT preliminary values used in multiple time periods for the operating node. The monitoring device is further configured to monitor performance metrics of the operating node under the multiple SMT preliminary values. The determining device is further configured to select a SMT preliminary value corresponding to a time period having optimal performance metrics as the SMT revised value.

According to an embodiment of the present invention, wherein the setting device is further configured to set multiple SMT preliminary values for multiple operating nodes, wherein at least one operating node has multiple SMT preliminary values set for multiple time periods. The monitoring device is further configured to monitor performance metrics of the multiple operating nodes under the multiple SMT preliminary values. The determining device is further configured to select a SMT preliminary value of an operating node corresponding to a time period having optimal performance metrics as the SMT revised value.

According to an embodiment of the present invention, in response to monitoring deterioration in the performance metrics, the operations of the setting device, the monitoring device and the determining device are iterated.

According to an embodiment of the present invention, the setting device, and the monitoring device are operative only at runtime.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented data processing method, comprising:
    performing a training phase comprising:
        setting at least one simultaneous multithreading (SMT) preliminary value for a first operating node from a plurality of operating nodes, and in response the first operating node simultaneously executes, within a single clock cycle, instructions from a number of hardware threads equal to the at least one SMT preliminary value, the at least one SMT preliminary value defining the number of hardware threads;
        monitoring performance metrics of the first operating node set to the at least one SMT preliminary value of the number of hardware threads;
        determining a SMT revised value based on the performance metrics associated with the first operating node for the at least one SMT preliminary value, the SMT revised value being selected from the at least one SMT preliminary value defining the number of hardware threads and one more other SMT preliminary values defining one or more other numbers of hardware threads; and
    performing an execution phase comprising:
        setting the SMT revised value from the at least one SMT preliminary value defining the number of hardware threads and one or more other SMT preliminary values defining one or more other numbers of hardware threads for both the first operating node and a second operating node from the plurality of operating nodes based on the training phase for the first operating node for the at least one SMT preliminary value, and in response both, the first operating node and the second operating node, simultaneously execute, within a single clock cycle, instructions from a number of hardware threads equal to the SMT revised value respectively.

2. The method according to claim 1, further comprising:
    operating the first operating node under a MapReduce framework; and wherein,
    the first operating node is set with the at least one SMT preliminary value, and monitored to determine the SMT revised value in a first stage of the MapReduce framework.

3. The method according to claim 2, further comprising:
resetting the first operating node with the at least one SMT preliminary value, and monitoring the performance metrics of the first operating node to determine the SMT revised value, in response to detecting that the first operating node switches from the first stage to a second stage of the MapReduce framework, wherein the first stage and the second stage correspond to:
only Map operation in the first stage and concurrent Map and Reduce operations in the second stage; or concurrent Map and Reduce operations in the first stage and only Reduce operation in the second stage.

4. The method according to claim 1, further comprising:
operating the first operating node under a MapReduce framework; and, wherein,
in response to the first operating node being in a stage of only Map operation of the MapReduce framework, setting the first operating node with the at least one SMT preliminary value, monitoring the performance metrics of the first operating node, and determining the SMT revised value, wherein
determining the SMT revised value is based on the performance metrics of the first operating node set to the at least one SMT preliminary value monitored in a predetermined task iteration.

5. The method according to claim 1, wherein the SMT revised value is determined based on the performance metrics of the first operating node monitored in a predetermined time window.

6. The method according to claim 1, wherein:
setting the first operating node with the at least one SMT preliminary value further includes setting multiple SMT preliminary values for the plurality of operating nodes, including setting a SMT preliminary value for each operating node;
monitoring the performance metrics of the first operating node further includes monitoring the performance metrics of the plurality of operating nodes set to the multiple SMT preliminary values; and
determining the SMT revised value further includes selecting a SMT preliminary value of an operating node having optimal performance metrics as the SMT revised value.

7. The method according to claim 1, wherein:
setting the first operating node with the at least one SMT preliminary value further includes setting multiple SMT preliminary values for the first operating node, including setting multiple SMT preliminary values used in multiple time periods for the operating node;
monitoring the performance metrics of the first operating node further includes monitoring the performance metrics of the first operating node set to the multiple SMT preliminary values; and
determining the SMT revised value further includes selecting a SMT preliminary value corresponding to a time period having optimal performance metrics as the SMT revised value.

8. The method according to claim 1, wherein:
setting the first operating node with the at least one SMT preliminary value further includes setting multiple SMT preliminary values for multiple operating nodes from the plurality of operating nodes, wherein at least one operating node has multiple SMT preliminary values set for multiple time periods;
monitoring the performance metrics of the first operating node further includes monitoring the performance metrics of the multiple operating nodes set to the multiple SMT preliminary values; and
determining the SMT revised value further includes selecting a SMT preliminary value of an operating node corresponding to a time period having optimal performance metrics as the SMT revised value.

9. The method according to claim 1, further comprising:
iterating the method, in response to monitoring deterioration in the performance metrics.

10. The method according to claim 1, wherein the first operating node is set with the at least one SMT preliminary value, and the performance metrics are monitored for determining the SMT revised value only at runtime.

11. A data processing system, comprising:
a memory;
a multiprocessor communicatively coupled to the memory, the multiprocessor comprising a plurality of processors that execute in simultaneous multithreading (SMT) mode; and
a feature selection module stored on the memory and executed by the multiprocessor, wherein the feature selection module is configured to perform the steps of a method comprising:
performing a training phase comprising:
setting, using a setting device, a first SMT value for a first processor from the multiprocessor, wherein the processor simultaneously executes, within a single clock cycle, instructions from a number of hardware threads equal to the first SMT value, the first SMT value defining the number of hardware threads;
monitoring, using a monitoring device, performance metrics for the first processor set to the first SMT value of the number of hardware threads;
determining, using a determining device, a second SMT value based on the performance metrics associated with the first operating node for the first SMT value, the second SMT value being selected from the first SMT value defining the number of hardware threads and one or more other SMT values defining one or more other numbers of hardware threads; and
performing an execution phase comprising:
setting the second SMT value from the first SMT value defining the number of hardware threads and one or more other SMT values defining one or more other numbers of hardware threads for each processor from the plurality of processors of the multiprocessor based on the training phase for the first operating node for the first SMT value, and in response, each respective processor simultaneously executes, within a single clock cycle, instructions from a number of hardware threads equal to the second SMT value.

12. The system according to claim 11, wherein:
the first processor operates under a MapReduce framework; and
the setting device, the monitoring device, and the determining device are operated when the first processor is in a first stage of the MapReduce framework.

13. The system according to claim 12, wherein the method further comprising:
re-operating the setting device, the monitoring device, and the determining device, in response to detecting that the first processor switches from the first stage to a second stage, wherein the first stage and the second stage correspond to:
only Map operation in the first stage and concurrent Map and Reduce operations in the second stage; or concurrent Map and Reduce operations in the first stage and only Reduce operation in the second stage.

14. The system according to claim 11, wherein:
the first processor operates under a MapReduce framework;
the setting device, the monitoring device, and the determining device are operated when the first processor is in a first stage of only Map operation of the MapReduce framework; and
the monitoring device is further configured to determine the second SMT value, based on the performance metrics of the first processor set to the first SMT value monitored in a predetermined task iteration.

15. The system according to claim 11, wherein the monitoring device is further configured to
determine the second SMT value based on the performance metrics of the first processor set to the first SMT value monitored in a predetermined time window.

16. The system according to claim 11, wherein:
the setting device is further configured to set multiple SMT values for multiple processors, including setting a SMT preliminary value for each processor;
the monitoring device is further configured to monitor the performance metrics of the multiple processors set to the multiple SMT values; and
the determining device is further configured to select a SMT value of a processor having optimal performance metrics as the second SMT value.

17. The system according to claim 11, wherein:
the setting device is further configured to set multiple SMT values for the first processor, including setting the multiple SMT values used in respective multiple time periods for the first processor;
the monitoring device is further configured to monitor the performance metrics of the first processor set to the multiple SMT values; and
the determining device is further configured to select a SMT value corresponding to a time period having optimal performance metrics as the second SMT value.

18. The system according to claim 11, wherein:
the setting device is further configured to set multiple SMT preliminary values for the plurality of processors, wherein at least one processor has multiple SMT preliminary values set for multiple time periods;
the monitoring device is further configured to monitor the performance metrics of the plurality of processors set to the multiple SMT preliminary values; and
the determining device is further configured to select a SMT preliminary value of a processor corresponding to a time period having optimal performance metrics as the second SMT value.

19. The system according to claim 11, wherein the feature selection module is further configured to
iterate the operations of the setting device, the monitoring device, and the determining device, in response to monitoring deterioration in the performance metrics.

20. The system according to claim 11, wherein the setting device, the monitoring device, and the determining device are only operative at runtime.

* * * * *